W. H. FITCH.
COMBINATION EMERGENCY AND TRANSMISSION BRAKE MECHANISM.
APPLICATION FILED MAY 6, 1915.

1,186,387.

Patented June 6, 1916.

Witnesses
Fenton W Belt
L. W. Sherwood

Inventor
W. H. Fitch
By Franklin H. Hough
Attorney

UNITED STATES PATENT OFFICE.

WILLIAM H. FITCH, OF FORT WORTH, TEXAS.

COMBINATION EMERGENCY AND TRANSMISSION BRAKE MECHANISM.

1,186,387.   Specification of Letters Patent.   Patented June 6, 1916.

Application filed May 6, 1915. Serial No. 26,340.

*To all whom it may concern:*

Be it known that I, WILLIAM H. FITCH, a citizen of the United States, residing at Fort Worth, in the county of Tarrant and State of Texas, have invented certain new and useful Improvements in Combination Emergency and Transmission Brake Mechanism; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in combination emergency and transmission brakes for automobiles, especially of the Ford type and comprises a simple and efficient apparatus of this nature having various details of construction, combinations and arrangements of parts which will be hereinafter fully described, shown in the accompanying drawings and then specifically defined in the appended claim.

Figure 1:
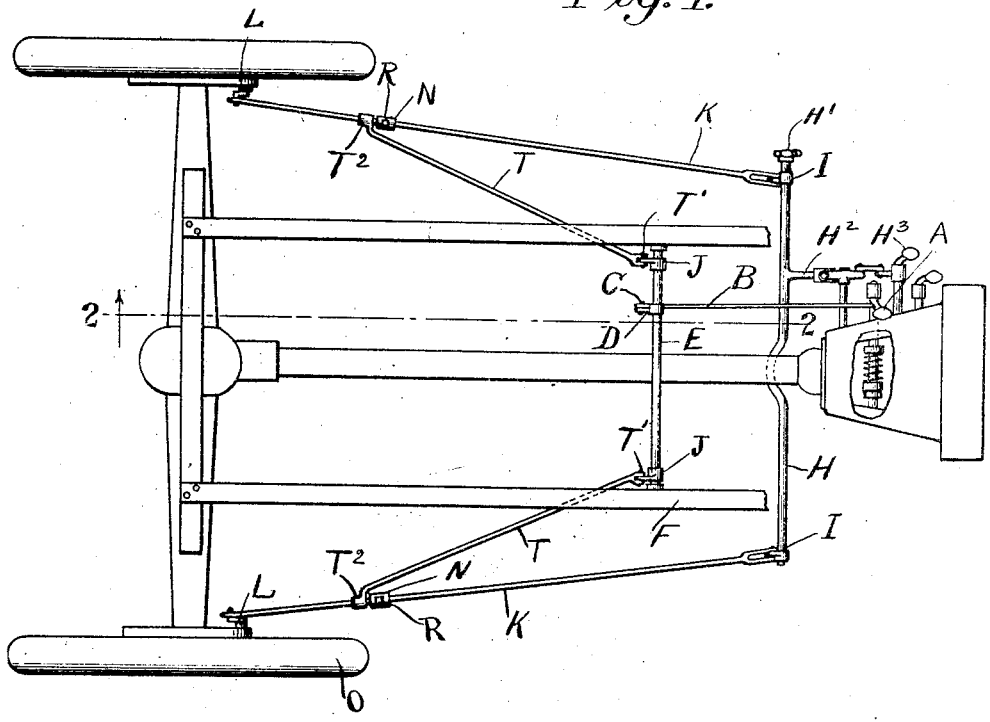
Figure 2:
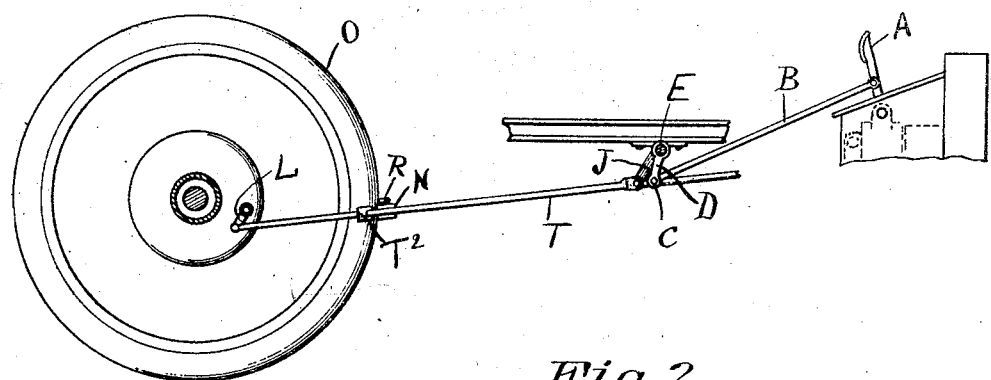

My invention is illustrated in the accompanying drawings, in which:

Figure 1 is a top plan view of the apparatus. Fig. 2 is a sectional view on line 2—2 of Fig. 1.

Reference now being had to the details of the drawings by letter, F designates a portion of the chassis of an automobile having rear wheels O, and L designates cranks for operating the usual brake mechanism to the wheels.

H is an emergency brake operating rock shaft having a lever H' at one end and a forwardly projecting arm H² adapted to be actuated by pedal H³ in the usual way, and K, K are emergency brake rods, having their forward ends forked and pivotally connected to the arms I and their rear ends pivotally connected to the cranks L and are of the usual construction found upon the Ford type of automobile.

A rock shaft E is mounted upon the chassis and has an arm D fixed thereto which in turn is pivotally connected at C to a rod B, which latter has pivotal connection with the brake pedal A. Collars J are fixed to the shaft E and have integral arms which are pivotally connected at T' to the rods T, which latter have collars T² at their rear ends through which the emergency brake rods K are movable. Collars N are adjustably held by means of nuts R upon the rods K.

In operation when it is desired to relieve the emergency brake mechanism of the strain coming upon the apparatus when the brake is applied, the operator by tilting the foot pedal A may cause the rods T to be drawn forward, which will cause the collars T² to bear frictionally against the collars N, thus causing a longitudinal pulling force to be applied to the rods K through the medium of the collars N and T² and also through the pivotal connections between the shafts H and K. If desired, however, the emergency brake mechanism may be operated in the usual way independent of the supplemental mechanism shown and described and which forms subject matter of the present application.

What I claim to be new is:—

A brake lever mechanism comprising, in combination with the frame of a vehicle, an emergency rock shaft journaled thereon and having crank arms fastened thereto, brake rods having slotted ends engaged by said crank, a rocking equalizing bar, lever-actuated mechanism for rocking the same, collars upon the equalizing bar and having projecting lugs thereon, rods pivotally connected to said lugs at corresponding ends, collars upon their opposite ends through which said brake rods pass, and adjustable collars upon the brake rods adapted to limit the movements of the collars at the ends of said rods.

In testimony whereof I hereunto affix my signature in presence of two witnesses.

WILLIAM H. FITCH.

Witnesses:
ARTHUR L. WEISSENBORN,
JNO. B. JAYNES.